(12) United States Patent
Mahmoud

(10) Patent No.: US 7,234,053 B1
(45) Date of Patent: Jun. 19, 2007

(54) METHODS FOR EXPANSIVE NETBOOT

(75) Inventor: Fadi A. Mahmoud, Livermore, CA (US)

(73) Assignee: Adaptec, Inc., Milpitas, CA (US)

( * ) Notice: Subject to any disclaimer, the term of this patent is extended or adjusted under 35 U.S.C. 154(b) by 386 days.

(21) Appl. No.: 10/712,710

(22) Filed: Nov. 12, 2003

Related U.S. Application Data

(60) Provisional application No. 60/484,875, filed on Jul. 2, 2003, provisional application No. 60/484,865, filed on Jul. 2, 2003.

(51) Int. Cl.
*G06F 15/177* (2006.01)
*G06F 9/445* (2006.01)

(52) U.S. Cl. .......................................... 713/2; 713/176

(58) Field of Classification Search .................. 713/1, 713/2, 100; 717/174, 176
See application file for complete search history.

(56) References Cited

U.S. PATENT DOCUMENTS

| | | | | |
|---|---|---|---|---|
| 5,421,009 A | * | 5/1995 | Platt | 709/221 |
| 5,577,210 A | * | 11/1996 | Abdous et al. | 709/219 |
| 5,881,236 A | * | 3/1999 | Dickey | 709/221 |
| 5,974,547 A | * | 10/1999 | Klimenko | 713/2 |
| 6,094,531 A | * | 7/2000 | Allison et al. | 717/176 |
| 6,421,777 B1 | * | 7/2002 | Pierre-Louis et al. | 713/2 |
| 6,751,658 B1 | * | 6/2004 | Haun et al. | 709/222 |
| 6,775,830 B1 | * | 8/2004 | Matsunami et al. | 717/176 |
| 6,834,299 B1 | * | 12/2004 | Hamilton et al. | 709/220 |
| 6,857,069 B1 | * | 2/2005 | Rissmeyer et al. | 713/2 |
| 6,874,060 B2 | * | 3/2005 | Blood et al. | 711/111 |
| 6,954,852 B2 | * | 10/2005 | Burokas et al. | 713/2 |
| 6,988,193 B2 | * | 1/2006 | French et al. | 713/2 |
| 6,990,573 B2 | * | 1/2006 | Cherian et al. | 713/1 |
| 2003/0126242 A1 | * | 7/2003 | Chang | 709/222 |

FOREIGN PATENT DOCUMENTS

WO  WO 9959059 A1 * 11/1999

OTHER PUBLICATIONS

Singer, Michael, "Cisco Gives iSCSI the Network Boot", Oct. 29, 2002, Earthweb News, http://news.earthweb.com/infra/article.php/1490471.*

* cited by examiner

*Primary Examiner*—Chun Cao
*Assistant Examiner*—Ji H. Bae
(74) *Attorney, Agent, or Firm*—Martine Penilla & Gencarella, LLP

(57) ABSTRACT

A method to boot up a server using a target storage device over a network is provided. The method includes installing an operating system by storing the operating system and a dynamic configuration program in the target storage device on the network where the location of the target device is designated by an internet protocol (IP) address. The method also includes accessing the operating system on the target storage device using the IP address and the dynamic configuration program, the accessing occurring through data block transfers.

17 Claims, 12 Drawing Sheets

METHODS FOR EXPANSIVE NETBOOT

CROSS REFERENCE TO RELATED APPLICATION

This application claims priority under 35 U.S.C. § 119(e) to provisional U.S. Patent Application No. 60/484,875, filed on Jul. 2, 2003, entitled "Methods for Expansive Netboot." Further, this application is related to U.S. Patent Application No. 60/484,865, filed on Jul. 2, 2003, entitled "Methods for Dedicated Netboot." The aforementioned patent applications are hereby incorporated by reference in their entirety.

BACKGROUND OF THE INVENTION

1. Field of the Invention

This invention relates generally to the field of computing technology and more particularly concerns optimization of server resources and data storage by enabling server access to operating system data from storage devices over a network using internet protocol and block data transfer.

2. Description of the Related Art

The art of networking computers has evolved over the years to bring computer users a rich communication and data sharing experience. Typically, in a network, numerous devices may be connected to a computer or a server to maximize computing power and efficiency. As is well known, new levels of sophisticated communication technologies enable users to share information across both large and small networks. In computer technology, computers may intercommunicate through data transmission through a network connecting numerous computers. For example, in a typical network system, a computer system may include a server connected to peripheral devices such as, for example, storage devices which are interconnected by data buses over a network.

To access and control certain types of peripheral devices connected to a network system, the server generally utilizes host adapter cards (or controllers) attached to the server's backplane. These controllers serve to coordinate and manage the data communication to and from the peripheral devices through the network. Controllers may be in the form of a video display adapter, an integrated drive electronics (IDE) controller, a small computer system interface (SCSI) controller, or other similar cards or chips which control peripheral devices. Such controllers may communicate with the peripheral devices through use of a bus connecting the server with the peripheral devices over a network.

FIG. 1A shows a typical computer network system 10. In this example, the system 10 includes servers 14, 16, and 18 connected with a network 12. In a typical network, the network 12 is an Ethernet network which utilizes a file based data transfer protocol. The servers 14, 16, and 18 include network interface cards (NIC) 32, 34, and 36 which are connected with NICs 26, 28, and 30 of the network 12. The network 12 is also connected with a hub 46 which itself is connected with terminals 20, 22, and 24. In one example, when multiple servers such as the servers 14, 16, and 18 are operating on the network 12, all of the servers 14, 16, and 18 boot and utilize an operating system. Consequently, all of the servers 14, 16, and 18 must be able to run boot up operations of some kind of operating system such as, for example, Windows 2000. Therefore, the servers 14, 16, and 18 may, in one example, have storage devices such as disk drives that may store the operating system for use by a particular server. In a redundant array of inexpensive disks (RAID) configuration, the operating system for each of the servers 14, 16, 18 would need at least two storage devices included within the server in this type of implementation. Therefore, as more servers are connected with the network 12, more resources are required to run an operating system on all of the servers. For example, if 60 servers were connected to the network 12, then at least 120 disk drives may be necessary if RAID is run on all of the servers. Therefore, extensive amounts of resources might be used that may be extremely costly for a user.

FIG. 1B shows an example a network system 40 which utilizes preboot execution environment (PXE) which is an Ethernet based system which allows servers to boot from storage devices on a network. Because PXE is utilized, the data transfer protocol utilized is a filed based transfer. Therefore, files needed for boot up operations may be transferred from a storage device to the server being utilized for boot up. The system 40, in this example, includes servers 14, 16, and 18 connected to the network 12 which in turn is connected to bootable drives 32, 34, 36. In such as example, each of the servers 14, 16, and 18 typically boots up using operating system data received from the bootable drives 32. Unfortunately, the system 40 can only utilize file based data transfer and does not have the flexibility to utilize other data transfer protocols. Therefore, if data storage systems which does not use file based data transfer such as, for example, internet SCSI (iSCSI), there is no defined protocol to enable boot up of those servers using data stored on storage devices on the network.

In view of the foregoing, what is needed is a new and improved methodology for optimizing data transmission methods by having a dedicated netboot system where servers can boot from storage devices using internet protocol with block based data transfer. Such an approach would thereby ensure proper initialization of the computer system and optimize data storage efficiencies.

SUMMARY OF THE INVENTION

Broadly speaking, the present invention fills these needs by providing computer implemented methods for optimizing server resources and data storage by enabling server access to operating system data from storage devices over a network using internet protocol and block data transfer.

It should be appreciated that the present invention can be implemented in numerous ways, including as a process, an apparatus, a system, a device, a method, or a computer readable medium. Several inventive embodiments of the present invention are described below.

In one embodiment, a method to boot up a server using a target storage device over a network is provided. The method includes installing an operating system by storing the operating system and a dynamic configuration program in the target storage device on the network where the location of the target device is designated by an internet protocol (IP) address. The method also includes accessing the operating system on the target storage device using the IP address and the dynamic configuration program, the accessing occurring through data block transfers.

In another embodiment, a method to install an operating system on a target storage device is provided. The method includes initiating setup to install the operating system and receiving an IP address of a subsystem where the operating system is to be stored. The method also includes determining a number of storage devices located in the subsystem and receiving identification of the target storage device selected from the number of storage devices located in the subsystem. The method further includes installing the operating system in the target storage device using block data transfer.

In yet another embodiment, a method to boot up a server using a storage device over a network is provided. The method includes retrieving an operating system boot loader at a first sector of the storage device, a location of the storage device being designated by an IP address stored during an operating system installation process. The method also includes booting up the server using an operating system located on the target storage device by using the operating system boot loader.

The advantages of the present invention are numerous. Specifically, by having a dedicated netboot, servers do not have to have their own operating systems stored on each of their storage devices. Instead, servers can access storage devices over the network using internet protocol (IP) with block based data transfer and boot up using operating system data on the storage device. Therefore, systems which use block based data transfer such as, for example, internet SCSI can be utilized. Consequently data storage may be optimized so the operating system(s) may be loaded onto the servers from one or a small number of storage devices. As a result, data storage resources may be managed in an optimized manner so unnecessary costs associated with having an excess number of boot storage devices may be avoided.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE EXEMPLARY EMBODIMENTS

An invention is described for a method of accessing an operating system and booting up from a storage device using a block based data transfer protocol over a network so an optimized amount of data may be transmitted in a computer system. In this methodology, dedicated netboot is utilized so a server can boot up and access an operating system from a boot up storage device located on a network using internet protocol with block based data transfer. It will be obvious, however, to one skilled in the art, that the present invention may be practiced without some or all of these specific details. In other instances, well known process operations have not been described in detail in order not to unnecessarily obscure the present invention.

Figure 1A:
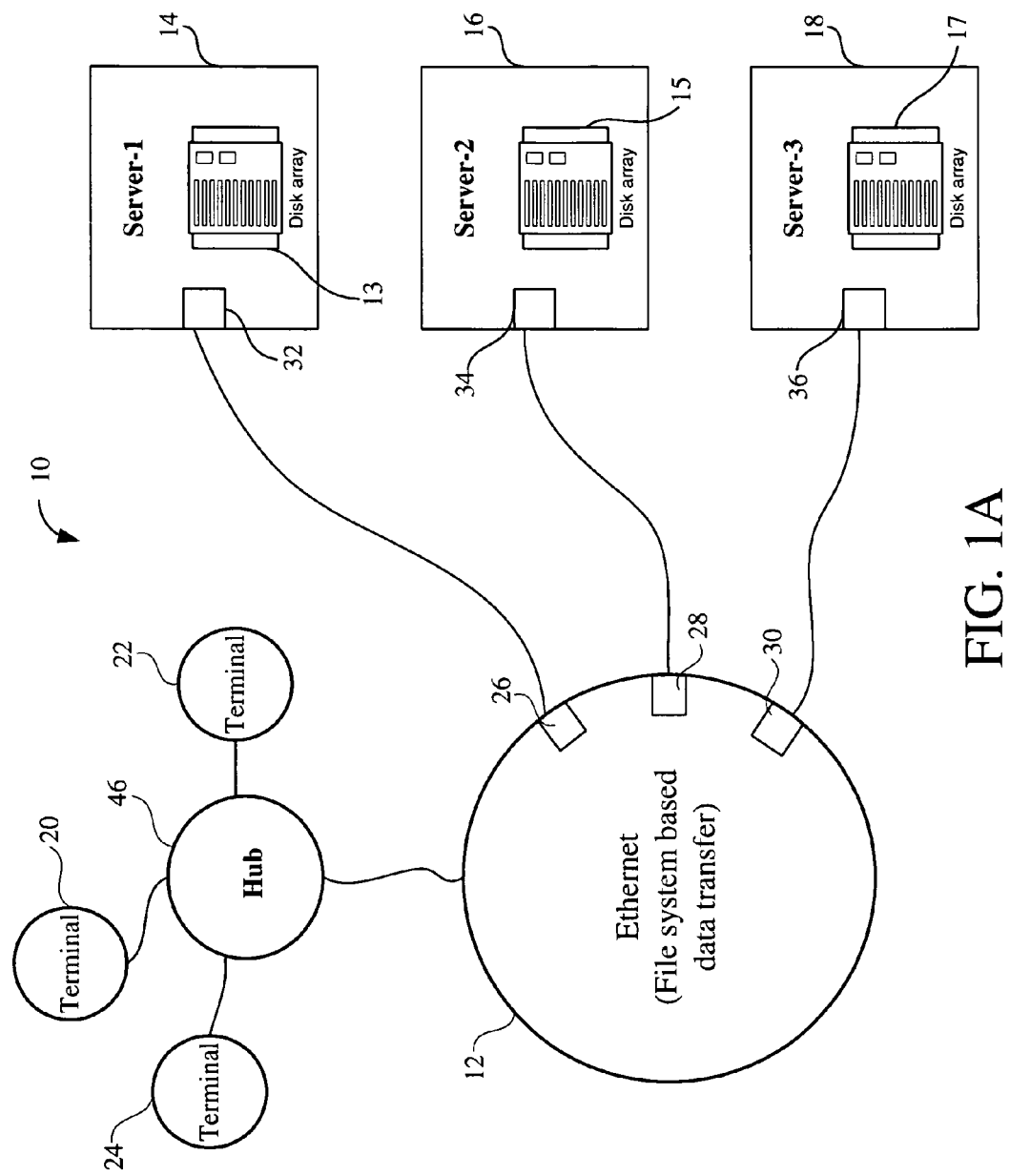
FIG. 1A shows a typical computer network system.
Figure 1B:
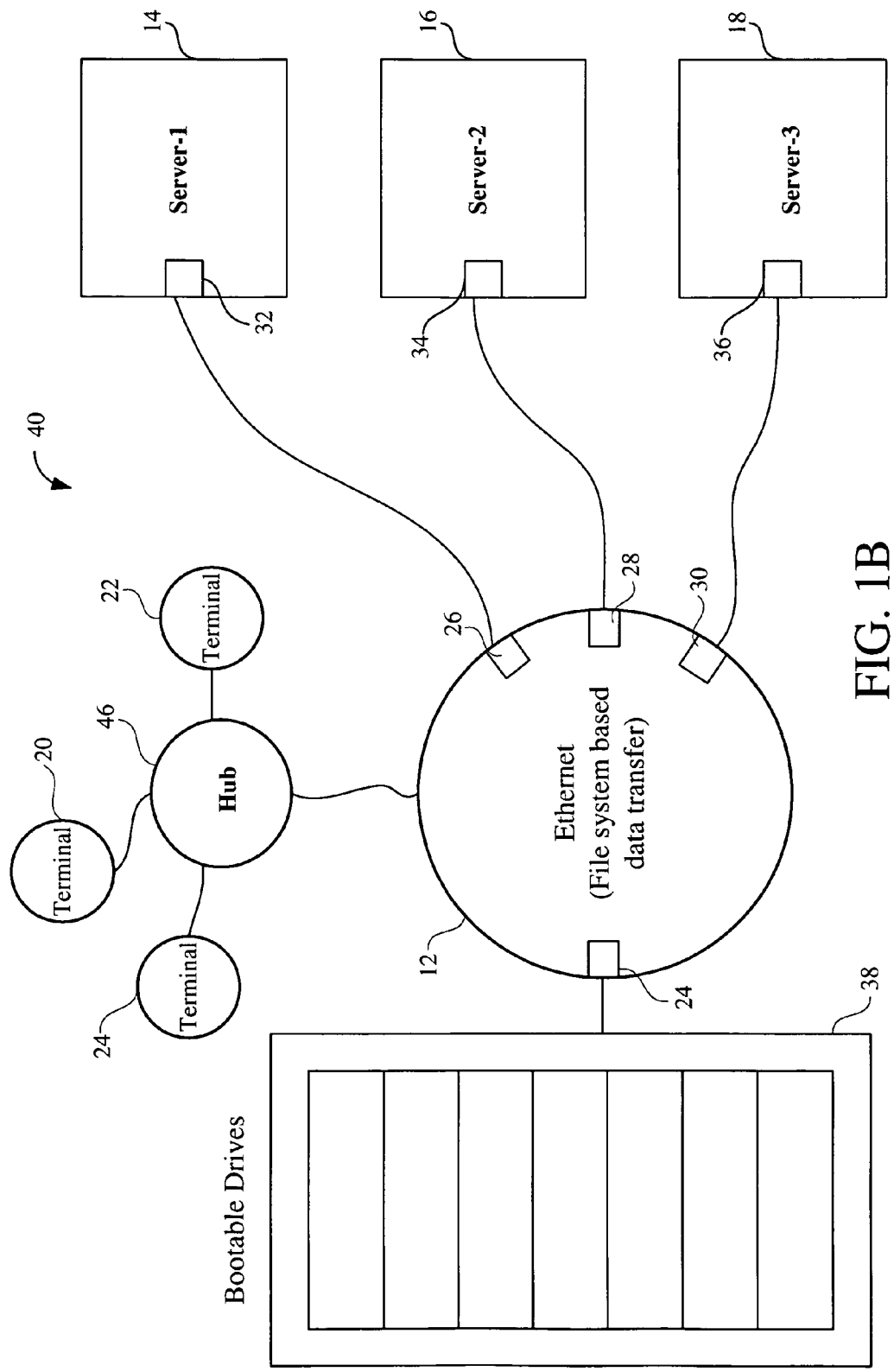
FIG. 1B shows an example a network system which utilizes preboot execution environment (PXE) which is an Ethernet based system which allows servers to boot from storage devices on a network.
Figure 2:
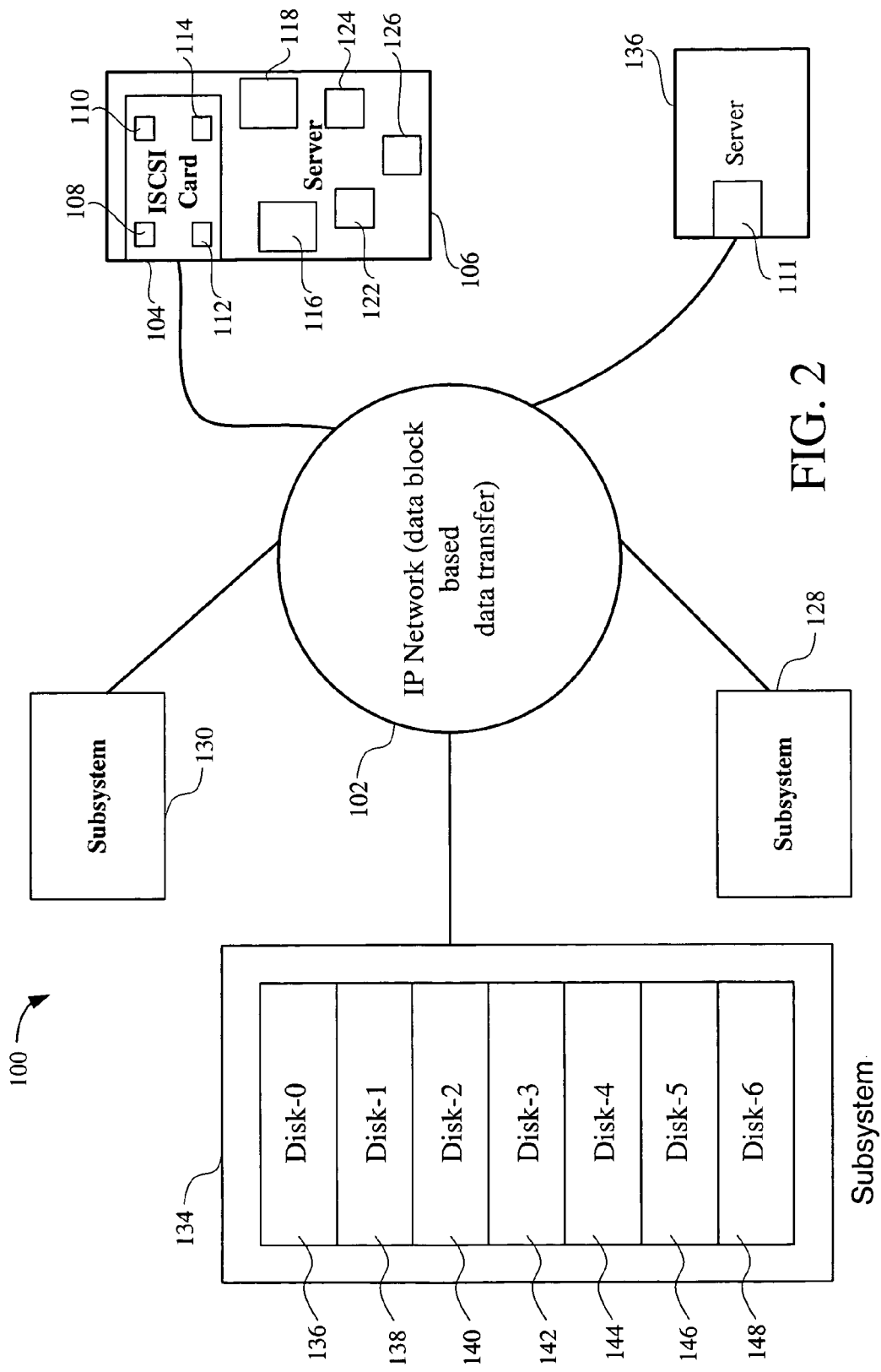
FIG. 2 shows a computer system where dedicated netboot may be implemented in accordance with one embodiment of the present invention.

FIG. 2 shows a computer system 100 where dedicated netboot may be implemented in accordance with one embodiment of the present invention. In this embodiment, the system 100 includes a server 106 connected with a network 102. The network 102 may be any suitable type of network such as, for example, a storage area network, a wide area network, a local area network, etc. The server 106 may be any suitable type of server in any suitable configuration such as, for example, a blade server, etc. that in one embodiment may be located in a rack. In addition, there may be any suitable number of servers connected onto the network. In one embodiment, there are 60 servers connected onto the network 102 ending with server-60 136. The network 102 is connected with storage subsystems 128, 130, and 134. In one embodiment, an iSCSI card 104 is attached onto the server 106 through a PCI connection. It should be appreciated that the system 100 may have any suitable number of storage subsystems and any suitable number of servers depending on the system 100 configuration. The iSCSI card may be in any other suitable form such as a chip or circuitry on the motherboard as long as the functionality of the iSCSI card is retained. It should also be understood that although the functionality of the present invention is described in terms of iSCSI configuration, the methodology described herein may also be utilized to optimize the functionality of storage protocols for any suitable type of storage systems using any suitable protocol.

The server 106 includes a CD ROM drive 116, a BIOS boot select (BBS) 118, a memory 124, a microprocessor 126, a system BIOS 122, and an iSCSI card 104. The iSCSI card 104 enables connection of the server 106 to the network 102. The CD ROM drive 116 may be utilized for an installation process when an operating system installation disk is a CD ROM. The BBS 118 stores the types of storage devices where the BIOS looks to boot from and also the order in which the BIOS looks to the devices for boot up data. In one embodiment, the boot order may be set so that boot up is first attempted from a storage subsystem over the network 102.

The iSCSI card 104 includes a TCP offload engine (TOE) 108, option ROM BIOS 112, an iSCSI input output processor (IOP) 110, and a memory 114. The TOE 108 is an interface device that enables the iSCSI card 104 to communicate with other devices on the network 102. The option ROM BIOS 112 may contain the configuration information for use by the iSCSI IOP 110 to intelligently manage output to and input from devices connected to the iSCSI card 104.

Each of the subsystems 128, 130, and 134 (also known as DS0 through DS2 respectively) may each include a plurality of storage devices. In one embodiment, the subsystem 134 may include disk drives 136, 138, 140, 142, 144, 146, and 148 (also known as ID-0 through ID-6 respectively). It should be appreciated that the although disk drives are utilized in this embodiment, other types of storage devices such as, for example, CD-RW, CD-R, floppy disk drives, memory sticks, flash memory, etc. may be included and used within the subsystems 128, 130, and 134. In addition, the subsystem 134 can contain any suitable number of storage devices. In such an implementation, an operating system with accompanying data may be stored on one or more of the disk drives within any of the subsystems 128, 130 and 134. As described below, any, some, or all of the disk drives 136, 138, 140, 142, 144, 146, and 148 may contain operating system data to enable boot up by the server 106 (or any other server) connected to the network 102.

The first time the server 106 which uses the methods described herein attempts to boot up, there is no operating system installed on any of the subsystems 128, 130, and 134. Therefore, an installation process is conducted so when boot up occurs after installation of the operating system, the server 106 may know which disk contains the operating system data for boot up and therefore may boot up from a storage device over the network 102.

In an initial boot up process before installation has occurred, the system BIOS 122 communicates with the iSCSI card 104 to determine the configuration of storage devices connected to the server. In this embodiment, the iSCSI IOP 110 runs an iSCSI protocol which uses block based data transfer using internet protocol packets. Therefore, the iSCSI IOP 110 utilizes a kernel to determine the storage devices available to the server 106. The kernel is a code that is stored in the option ROM BIOS 112 and retrieves into the memory 114 to be utilized by the iSCSI IOP 110. If setup is not requested by the user, the kernel returns data stating that very large numbers of disk drives are connected onto the network but does not know or detect which drives have an operating system.

Before the kernel returns the data, a user may input a keystroke to indicate that setup mode is desired. In one embodiment, the user may press a keystroke such as, for example, control—A to put the server into setup mode. Once in setup mode, the user can input an IP address of the subsystem where the operating system is to be installed and where the server 106 is to boot from. This IP address may be stored in any suitable non-volatile memory so this data can be utilized by the system BIOS 122 when the system is rebooted. For exemplary purposes an IP address of 3.4.5.1 designating the subsystem 134 is utilized. The iSCSI IOP 110 then requests how many disk drives are located in the subsystem 134 at the IP address 3.4.5.1. The iSCSI IOP 110 uses a kernel to snoop the subsystem 134. In this exemplary embodiment, the kernel returns data indicating that disk drives 136, 138, 140, 142, 144, 146, and 148 exist at the subsystem 134. In one embodiment, predefined zoning may be utilized so a user knows which subsystem a particular server has access to and therefore knows how many drives the accessible subsystems have. In another embodiment, zoning does not have to be utilized where a particular server may have access to all of the subsystems 128, 130, and 134 on the network 102.

Before the Option ROM BIOS 112 can use the information regarding the number of disks at the subsystem, an operating system installation CD such as, for example, the Windows 2000 CD-ROM in the CD-ROM drive begins operating and requests the option ROM BIOS 112 determine how many drives there are on the subsystem 134 at the IP address 3.4.5.1. It should be appreciated that any suitable operating system may be installed such as, for example, Windows NT, Linux, etc. It should also be understood that the IP address of 3.4.5.1 is used only for exemplary purposes and that the storage device may have any suitable IP address. Windows 2000 then receives data from the option ROM BIOS 112 that the subsystem 134 has seven disk drives. The user is then prompted to select a disk drive to install the operating system to. It should be understood that the operating system may be installed in any suitable disk drive located in any suitable subsystem that the server is connected to. The user, in one example selects disk-4 144. Then the Windows 2000 installation program copies all of the required programs to disk-4 144 within the subsystem 134.

After the first phase of installation is done, the system is rebooted. Windows 2000 now knows that the boot up data is located within disk-4 144 within the subsystem 134 at IP address 3.4.5.1. The installation continues until Windows 2000 installation is finished and the disk-4 144 contains Windows 2000 operating system. Optionally, BBS 118 may be utilized to make disk-4 144 the primary boot up storage device. Therefore, at boot up, the server 106 will go to disk-4 144 to boot from it. An entry pointer associated with the boot up drive may be at device value of 80 h in system RAM of the server 106 so that the operation of booting can be accomplished by an INT 13 call. The booting operation can then take place from the entry pointer.

When the server is subsequently rebooted, system BIOS 122 goes to 80 h and requests the first sector data. The system BIOS 122 instructs the option ROM BIOS 112 to tell a kernel to obtain boot up data at the first sector. The option ROM BIOS 112 knows the IP address, finds the disk-4 144, and feeds the data from the first sector to the system BIOS 122. In one embodiment the data from the first sector is an operating system boot loader. It should be appreciated that the data in the first sector may be any suitable type of data that may enable the boot up of the server 106. The operating system boot loader starts running the boot process with data stored in disk-4 144.

If other servers are connected to the network 102, the hardware configuration can be the same for all servers. The other servers can then use the same process as with the server 106 where the IP address of the target storage device is received by the servers which can then boot from the target storage device because the operating system is already installed onto the target storage device. Therefore, to configure the other servers to boot from the disk-4 144, at power on, the control-A keystroke is utilized to bring up the setup screen and the IP address for the subsystem 134 gets stored in all the servers. Consequently, all of the servers can then access the disk-4 144 to boot up Windows 2000.

In another embodiment as discussed in further detail in reference to FIGS. 8–11, by use of a dynamic host configuration protocol (DHCP), other servers may automatically detect the target storage device(s) where the operating system has been installed in an initial installation process. Therefore, subsequent servers may boot from the appropriate target storage device(s) without an additional manual installation process.

In another embodiment, a boot sequence such as, for example, that described in U.S. Pat. No. 6,061,745 entitled "BBS one BIOS image multicard support" may be utilized. The disclosure of the aforementioned patent is hereby incorporated by reference.

It should be appreciated that although the methodology described herein in the exemplary embodiments utilize storage data transmission using a block based data transfer (blocks of data transmitted that are organized in, for example, data packets) instead of a file based transmission system (where whole files are transmitted), the present inventions has the flexibility of being able to enable netboot (booting from a over a network) by using either a file based transmission system (such as PXE) or a block based data transmission system (such as iSCSI)

Figure 3:
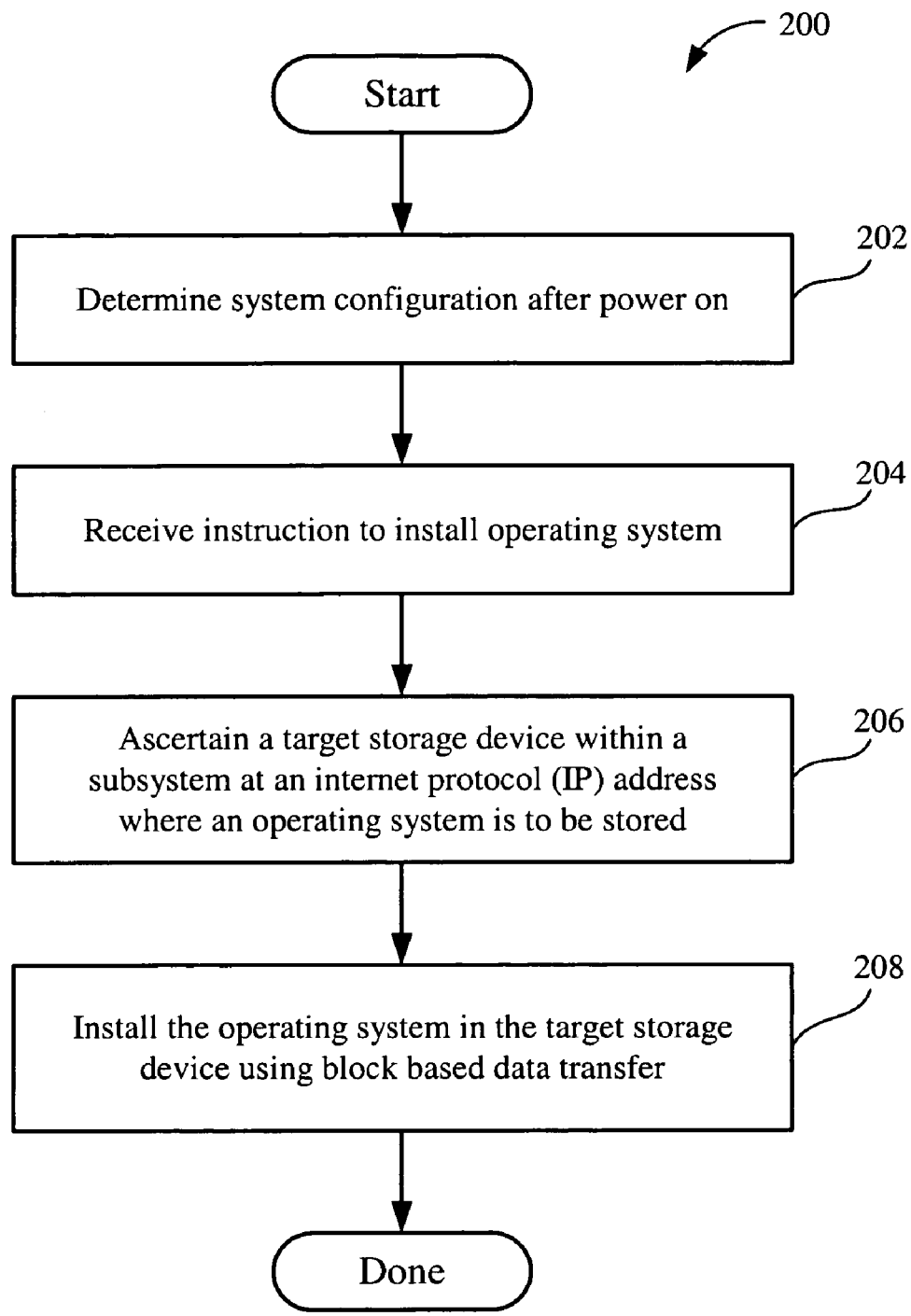
FIG. 3 shows a flowchart which defines an operating system installation in accordance with one embodiment of the present invention.

FIG. 3 shows a flowchart 200 which defines an operating system installation in accordance with one embodiment of the present invention. It should be understood that the processes depicted in the flowchart 200 may be in a program instruction form written on any type of computer readable media. For instance, the program instructions can be in the form of software code developed using any suitable type of programming language. For completeness, the process flow of FIG. 3 will illustrate an exemplary process whereby an operating system may be stored on a boot device connected to the network so a server may boot from the boot device by using iSCSI protocol.

The method begins with operation 202 which determines system configuration after power on. Operation 202 examines a network system and finds storage devices connected to it. Operation 202 is described in further detail in reference to FIG. 4.

After operation 202, the method moves to operation 204 where an instruction to install an operating system is received. As indicated below, user input is detected to start system setup and to receive IP address. In one embodiment, Windows 2000 is the operating system to be installed. It should be appreciated that any suitable operating system may be installed such as, for example, Windows NT, Linux, etc. Operation 204 is described in further detail in reference to FIG. 5.

Then the method moves to operation 206 which ascertains a target storage device within a subsystem at an internet protocol (IP) address where an operating system is to be stored. In this operation, the server receives input from a user as to which target storage device within a particular subsystem will store the operating system. In one embodiment, after the system BIOS is activated and before the kernel (as described in reference to FIG. 2) comes back with the configuration data, an operating system setup program may be run from a storage media such as, for example, a CD-ROM. At that point the operating system setup program then requests that the option ROM BIOS being run in the iSCSI IOP use a kernel to determine how many disks exist in the IP address inputted by a user. The kernel snoops the particular subsystem at the IP address and determines how many and types of storage devices exist in the particular subsystem. This information may be then transmitted to the system BIOS which may display the results for a user to view. The user may then input the particular storage device into which the operating system is installed.

The target storage device may be a subsystem that contains disk drive(s). It should be appreciated that any suitable type or number of storage devices may be connected to the network and utilized by the server for boot up purposes. It should be appreciated that any suitable type of networking standard may be utilized to facilitate communication between devices on the network. In one embodiment, iSCSI is utilized as an internet protocol based storage networking standard. The iSCSI standard is well known to those skilled in the art.

After operation 206, the method advances to operation 208 the operating system is installed in the target storage device using block based data transfer. Operation 208 utilizes an installation program for an operating system and installs the files of the operating system onto a storage device such as, for example, a disk drive located in the subsystem specified by a user. Operation 208 is described further in reference to FIG. 6.

Figure 4:
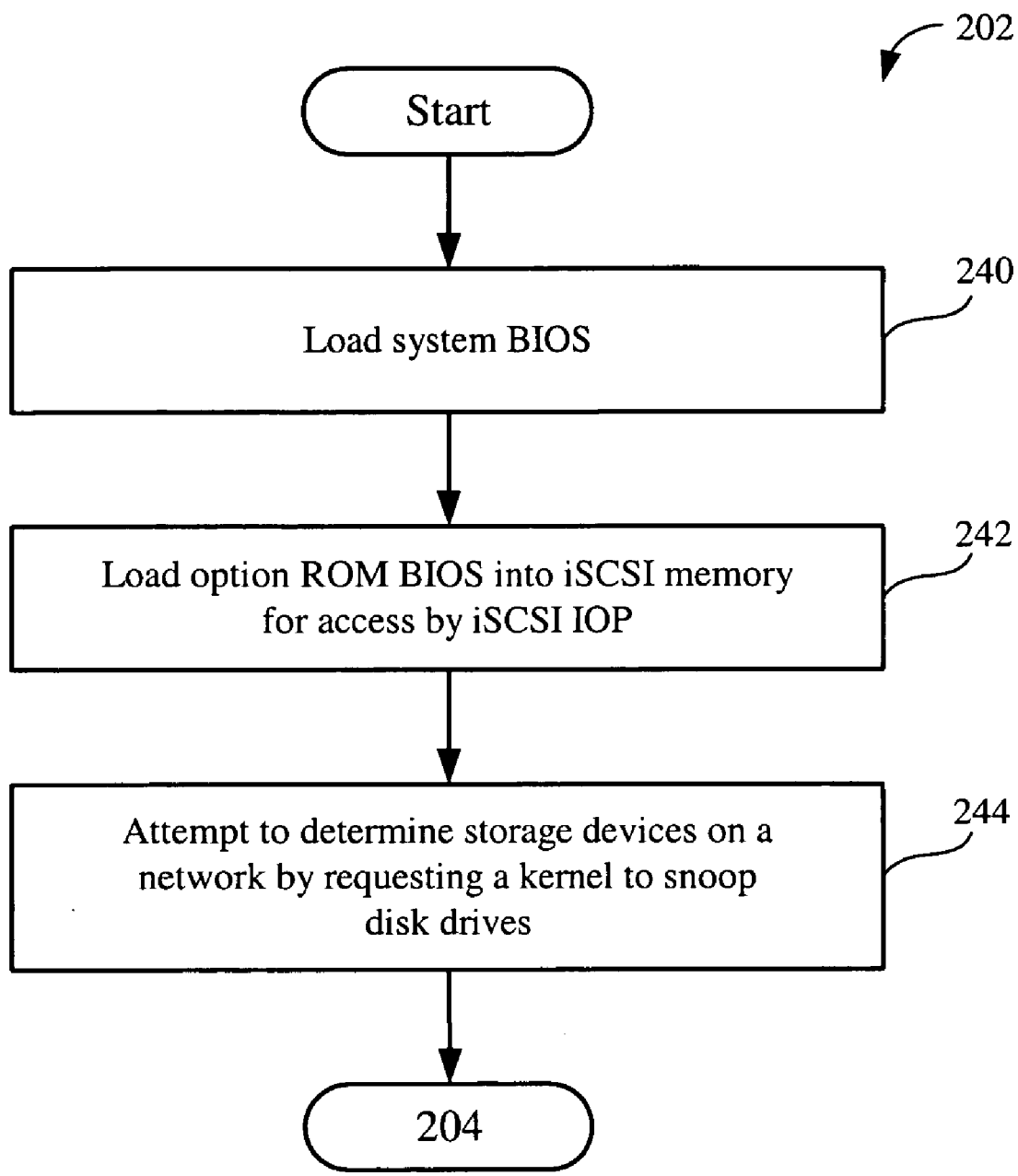
FIG. 4 shows a flowchart which determines system configuration after power on in accordance with one embodiment of the present invention.

FIG. 4 shows a flowchart 202 which determines system configuration after power on in accordance with one embodiment of the present invention. Flowchart 202 begins with operation 240 which loads system BIOS. In operation 240, the system BIOS communicates with the iSCSI card to initiate the loading of the option ROM BIOS.

After operation 240, the method advances to operation 242 which loads option ROM BIOS into iSCSI card memory for access by iSCSI IOP. The option ROM BIOS is code that is stored in non-volatile memory. It should be appreciated that the non-volatile memory may be any suitable type of device that can store data in a power off state. In one embodiment, the non-volatile memory is an EEPROM. The iSCSI IOP is a microprocessor that uses iSCSI code to manage the input and output of data.

Then the method proceeds to operation 244 which attempts to determine storage devices on a network by requesting a kernel to snoop disk drives. The kernel is code that is typically stored in the non volatile memory that may be retrieved into the iSCSI memory for use by the iSCSI IOP. The kernel can be generated to examine devices that are connected onto the network to determine what devices is accessible through the network. Unless an IP address is specified, the kernel will return with many disk drives located on the subsystems connected to the network. Therefore, this data is not typically useful in an installation process. Later, as described below in reference to FIG. 5, when an IP address of a subsystem is specified by a user, the kernel at that time can snoop the particular subsystem to show the storage devices in that one subsystem. In one embodiment, before the kernel can report network configuration back to the iSCSI IOP which in turn may notify the system BIOS, flowchart 204 begins.

Figure 5:
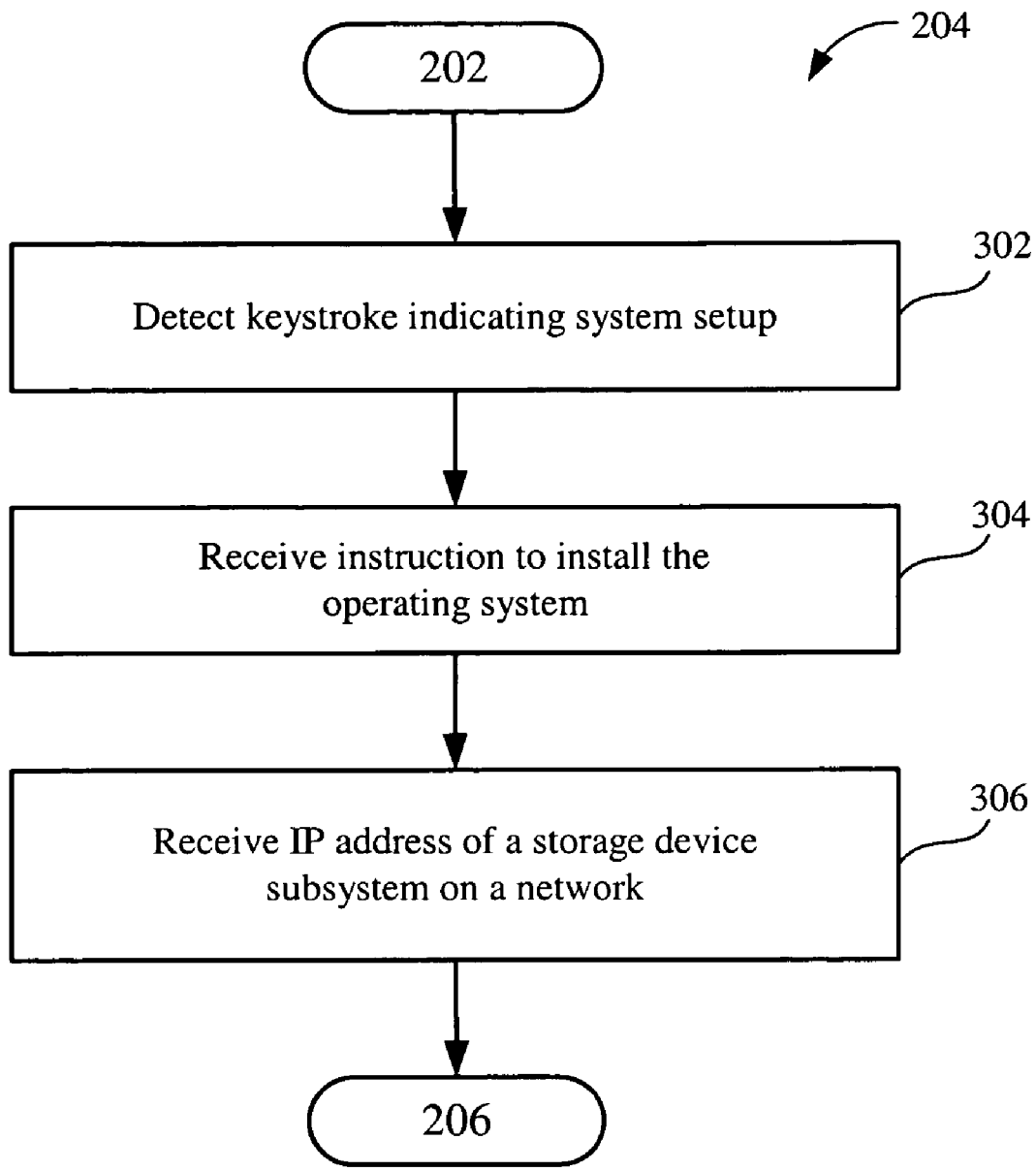
FIG. 5 illustrates a flowchart defining the operation of receiving instruction to install the operating system in accordance with one embodiment of the present invention.

FIG. 5 illustrates a flowchart 204 defining the operation of receiving instruction to install the operating system in accordance with one embodiment of the present invention. Flowchart 204 starts with operation 302 where keystroke indicating system setup is detected. It should be appreciated, that any suitable type of keystroke utilizing any suitable number of keys may be utilized to indicate that the system setup should be initiated. In one embodiment, control-A may be utilized as the keystroke. It should be appreciated, that the keystroke may be pressed in any suitable timeframe. In one embodiment, the keystroke may be pressed after the BIOS has begun to run and before the response from the kernel regarding the network configuration is received.

After operation 302, the method moves to operation 306 which receives an IP address of a storage device subsystem on a network. In operation 306, a user may input the IP address of the storage device subsystem where the operating system is to be stored. By inputting the IP address of the subsystem, the system BIOS may know where on the network the subsystem with the boot drive is located. After this occurs, the system BIOS can then instruct the iSCSI IOP to determine how many disk drives are on the subsystem where the operating system is to be stored.

Figure 6:
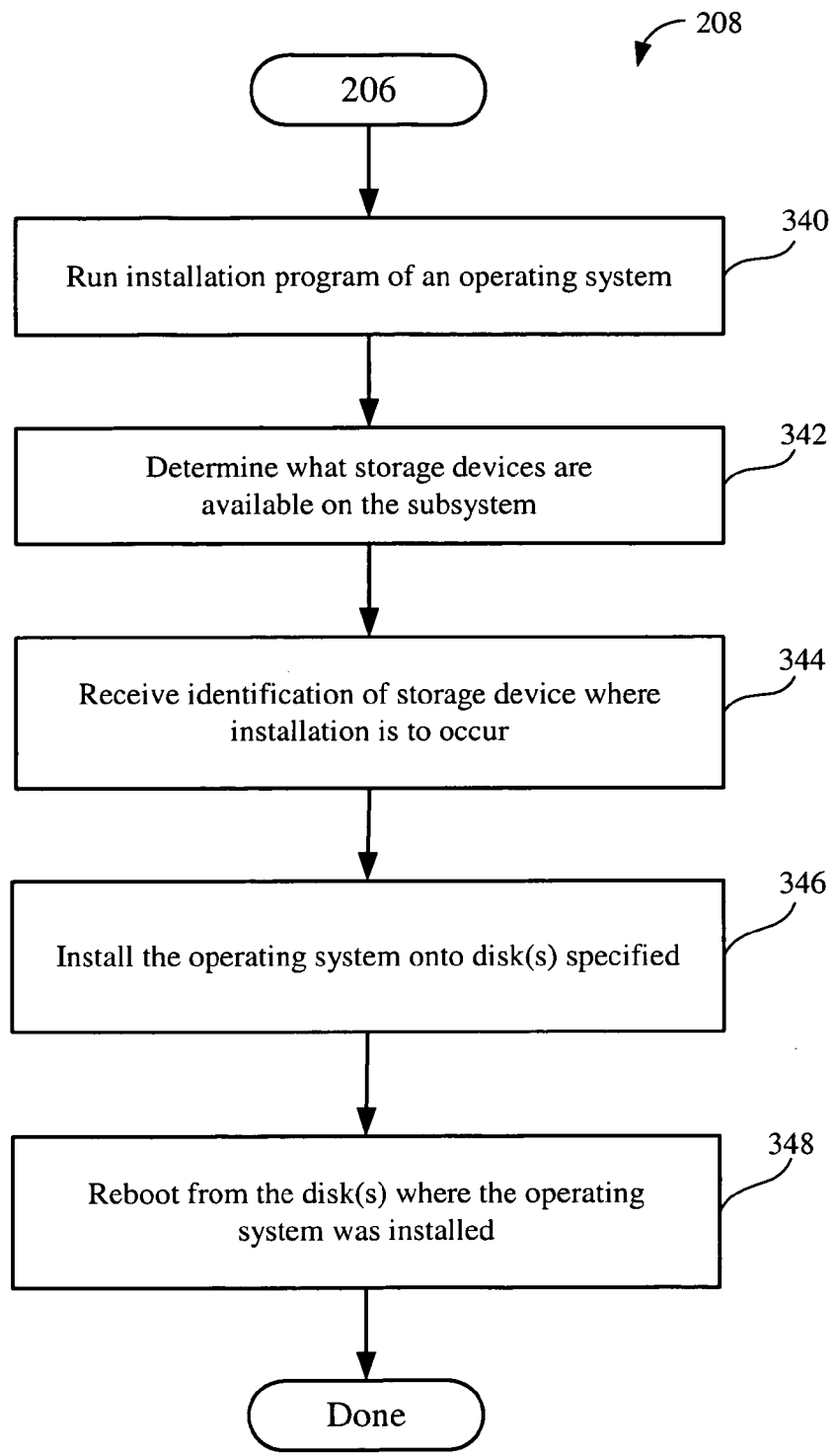
FIG. 6 shows a flowchart which defines installing the operating system in the target storage device within a subsystem over a network using block based data transfer in accordance with one embodiment of the present invention.

FIG. 6 shows a flowchart 208 which defines installing the operating system in the target storage device within a subsystem over a network using block based data transfer in accordance with one embodiment of the present invention. Flowchart 208 begins with operation 340 which runs installation program of an operating system. In one embodiment, before the system BIOS determines how many disk drives are on the subsystem as discussed above in reference to operation 306, the installation program for the operating system located in the CD-ROM may begin to operate.

After operation 340, the method moves to operation 342 which determines what storage devices are available on the subsystem. In one embodiment, after the installation program has started to run, it requests that the option ROM find out how many disks are located in the subsystem as indicated by the inputted IP address.

Then the method advances to operation 344 which receives the identification of a target storage device where installation is to occur. In operation 344, the installation program receives data indicating how many disk drives are located in the subsystem where the operating system is to be installed. The available disk drives are shown on the screen so a user may select which specific disk drive will contain the operating system.

After operation 344, the method proceeds to operation 346 which installs the operating system onto the target storage device specified. In one embodiment, after determining which disk drive will contain the operating system, the installation program copies the operating system files to the disk drive selected.

After operation 346, the method advances to operation 348 which reboots from the disks where the operating system was installed. In operation 348, the server reboots so the installation program can complete the installation of the operating system. After the installation is complete, the next time of the server powered on, the server uses the disk drive with the operating system to boot up. Therefore, the server may utilize a data block transport protocol and retrieve operating system data from a storage device over the network for booting up without the use of directly attached storage devices.

Figure 7:
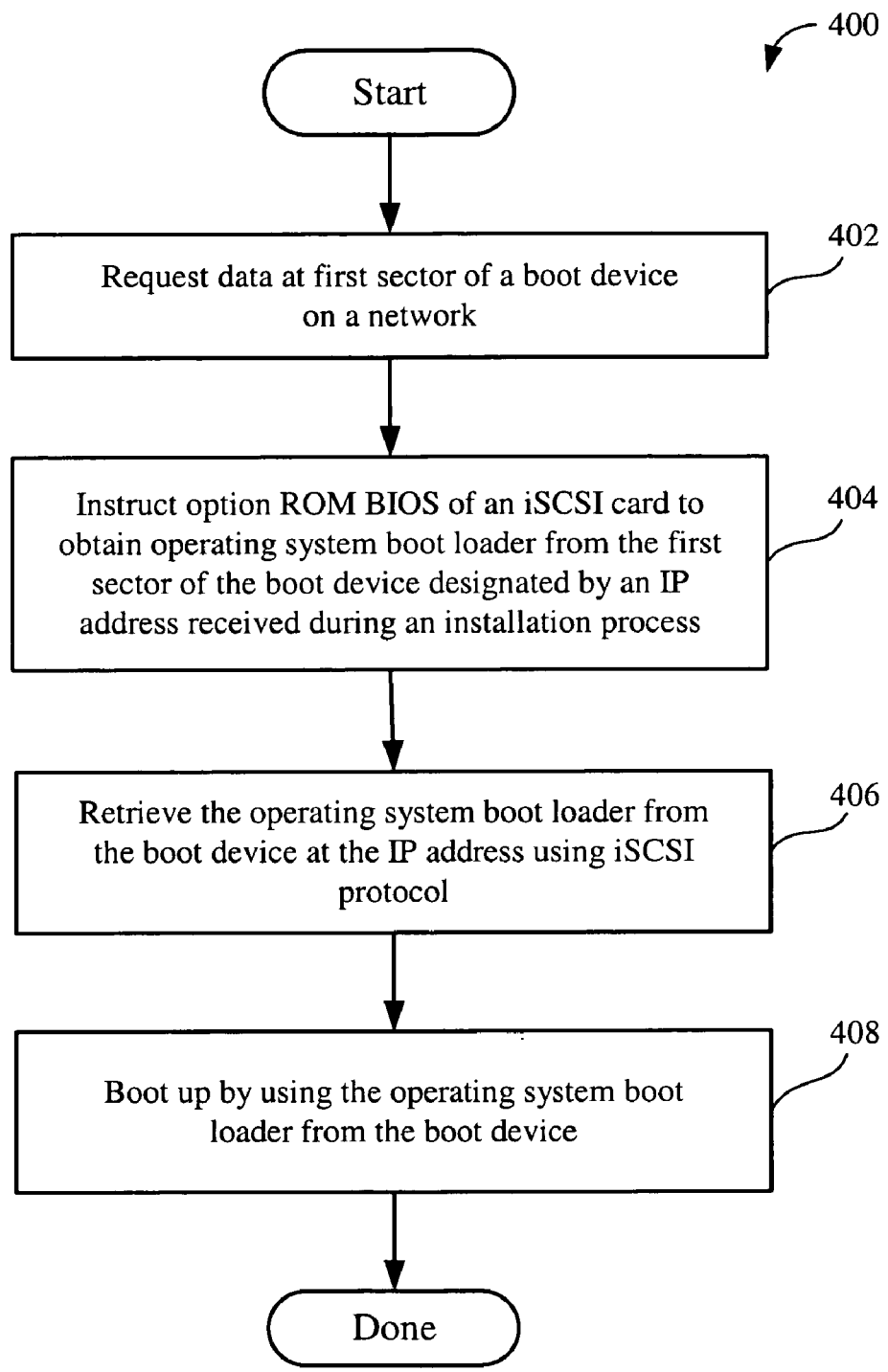
FIG. 7 illustrates a flowchart which shows a boot up process in accordance with one embodiment of the present invention.

FIG. 7 illustrates a flowchart 400 which shows a boot up process in accordance with one embodiment of the present invention. Flowchart 400 begins with operation 402 which requests data at a first sector of a boot device on a network. In this embodiment, at power up, the system BIOS begins the boot up process and therefore needs the first sector data of the boot drive. The boot drive (also known as a target storage device) is a storage device which has had an operating system installed on it through an installation process as described above in reference to FIGS. 3 through 6.

After operation 402, the method advances to operation 404 which instructs option ROM BIOS of an iSCSI card to obtain operating system boot loader from the first sector of the boot device designated by an IP address received during an installation process. In operation 404, the system BIOS directs the option ROM BIOS located on a iSCSI card to find and obtain data located in the first sector of the boot drive located on a subsystem connected to the network.

Then the method moves to operation 406 which retrieves operating system boot loader from the boot device at the IP address by using iSCSI protocol. Therefore, in one embodiment, boot up from a boot device is occurring over a network by use of a transmission protocol transferring data blocks instead of data files. In operation 406, the option ROM BIOS running in an iSCSI IOP uses iSCSI commands and methodology to send commands to the boot device using the IP address to retrieve the operating system boot loader. In such a way, the boot process may continue by retrieving operating system data through this fashion.

After operation 406, the method proceeds to operation 408 which runs boot up process using operating system data. Once the retrieving of operating system boot loader from the storage device has been completed, the boot up process itself using an operating system such as, for example, Windows 2000, Windows NT, Linux, etc. is well known to one skilled in the art.

FIGS. 8 through 11 illustrates the methodology of an operating system installation where after initial setup on a first server on a network, additional servers may boot from the target storage device(s) with the operating system without a further manual installation process. Therefore, by use of the dynamic host configuration protocol, each subsequent server may find the target storage device with the operating system automatically and boot from the appropriate storage device(s). It should be understood that the flow of FIGS. 8 through 11 is exemplary in nature and other suitable processes that are consistent with the methodology described herein may be utilized. For example, aspects of the initial installation process of the operating system on the target storage device(s) with respect to the first server as described in FIGS. 2 through 7 may be utilized.

Figure 8:
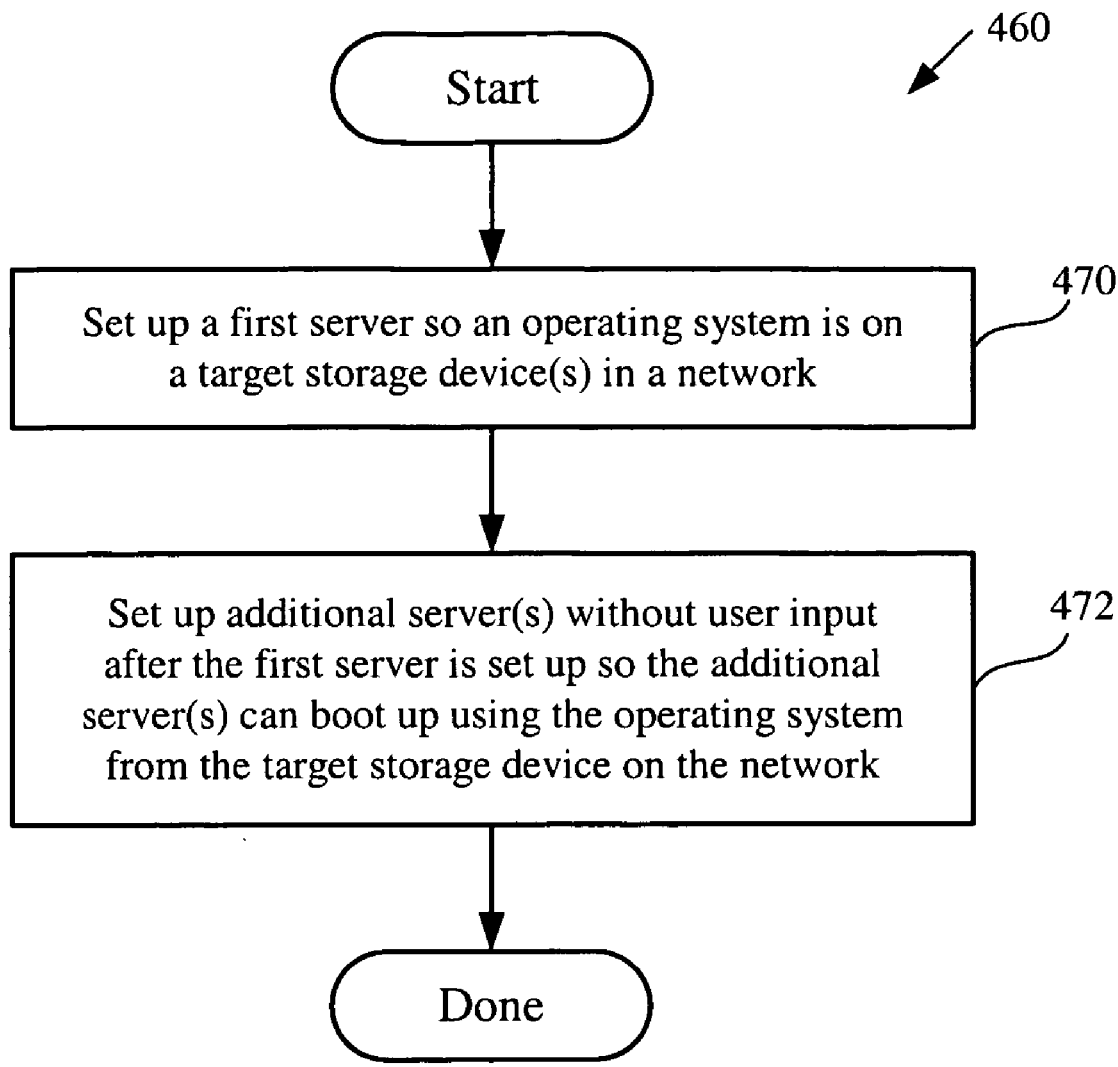
FIG. 8 shows a flowchart that defines a method for setting up servers in a network in accordance with one embodiment of the present invention.

FIG. 8 shows a flowchart 460 that defines a method for setting up servers in a network in accordance with one embodiment of the present invention. Flowchart 460 begins with operation 470 which sets up a first server so an operating system is on a target storage device(s) in a network. In one embodiment, operation 470 sets up a target storage device(s) so a first server as well as other servers attached to the network can boot from the target storage. It should be appreciated that the operating system may be installed on any suitable number of storage devices. In one embodiment, the operating system may be stored on one target storage device. In another embodiment, the target storage device may be stored in more than one target storage devices such as, for example, 2, 3, 4, 5, 6, 7, 8, etc. In one embodiment, once the target storage device(s) has the operating system installed, any of the server(s) attached to the network may boot from the target storage device(s) automatically without further user intervention. Operation 470 is described in further detail in reference to FIG. 9.

After operation 470, the method proceeds to operation 472 which sets up additional server(s) without user input after the first server is setup so the additional server(s) can boot up using the operating system from the target storage device on the network. In one embodiment, additional server(s) that may be connected to the network may be set up using programmed operations to enable the bootup of the server from the target storage device(s) without user input or intervention. Specifically, in a preferable embodiment, the server(s) determines what target storage device(s) have the operating system from which bootup can be initiated. Then the server retrieves data from the target storage device(s) so bootup can proceed.

Figure 9:
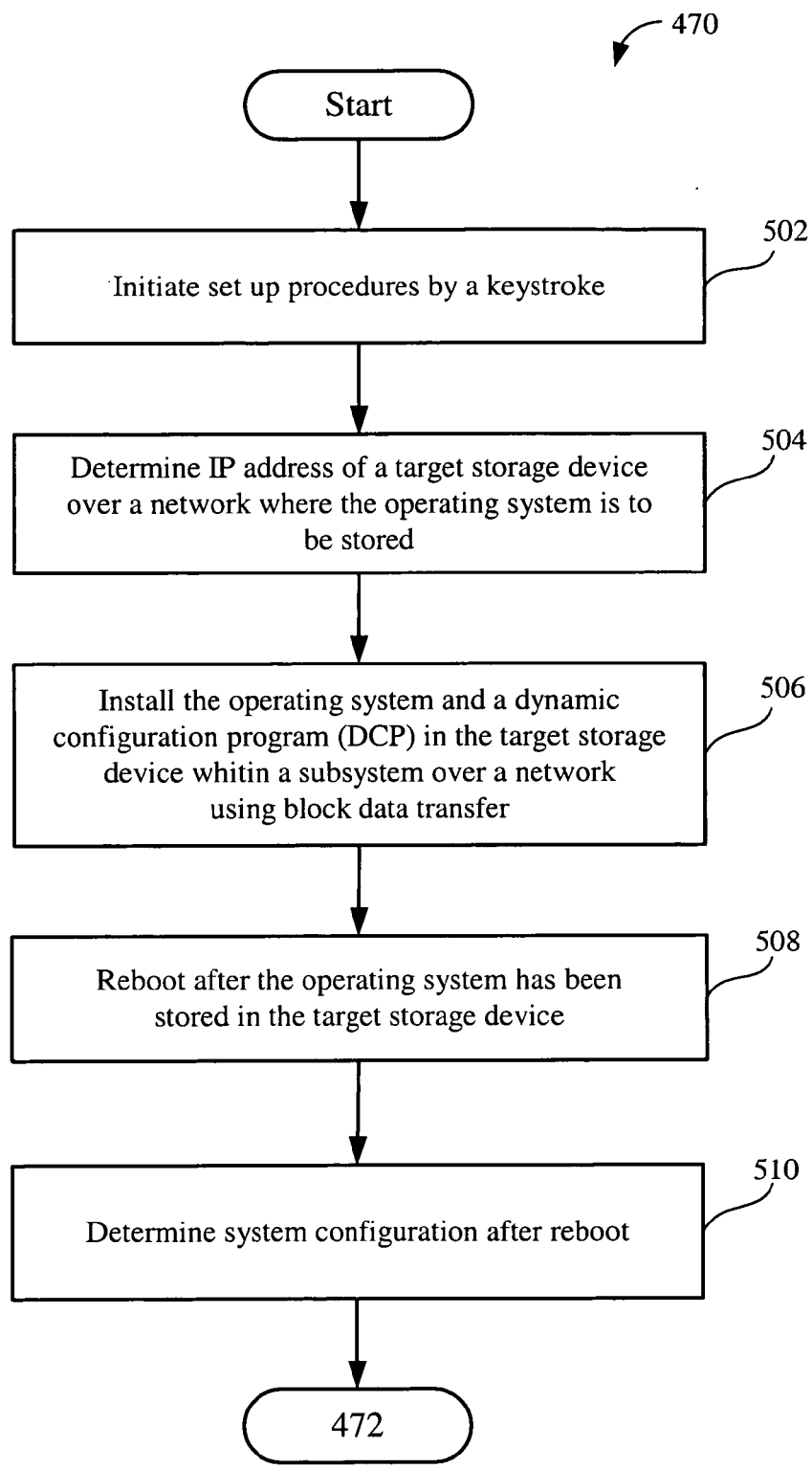
FIG. 9 illustrates a flowchart which defines setting up the first server in accordance with one embodiment of the present invention.

FIG. 9 illustrates a flowchart 470 which defines setting up the first server in accordance with one embodiment of the present invention. Flowchart 470 begins with operation 502 which initiates setup procedures by a keystroke. It should be appreciated that any suitable keystroke or combination of keystrokes may be utilized. In one embodiment, cntrl-A is utilized as the keystroke which initiates the operations to install an operating system on a target storage device(s) so server(s) may boot up over the network utilizing the operating system stored on the target storage device.

After operation 502, the method moves to operation 504 which determines IP address of a target storage device over a network where the operating system is to be stored. In one embodiment, a server is pre-configured with an IP address of the storage device(s) where the operating system is to be stored. In one embodiment, the software or hardware may be configured before a user takes possession of the server. In another embodiment, a user may configure the server and the storage network so certain target storage device(s) have the operating system where the server(s) may boot from.

Then operation 506 installs the operating system and a dynamic configuration program (DCP) in the target storage device within a subsystem over a network using block based data transfer. The DCP may be any suitable type of code that can enable the boot up process even when the server does not have the OS already installed on it. The DCP is described in further detail in reference to FIG. 11.

After operation 506, the method moves to operation 508 which reboots after the operating system has been stored in the target storage device. Once the operating system has been stored, the server may reboot from the target storage device and loads the OS from the target storage device.

Then the flowchart 470 finishes with operation 510 which determines system configuration after reboot. Once reboot as begun, kernels can be utilized with the DCP to determine the configuration of the system. In one embodiment, the kernels may find all of the peripheral devices available on the network and assign system resources to those devices so the OS may utilize any, some or all of the peripheral devices.

Figure 10:
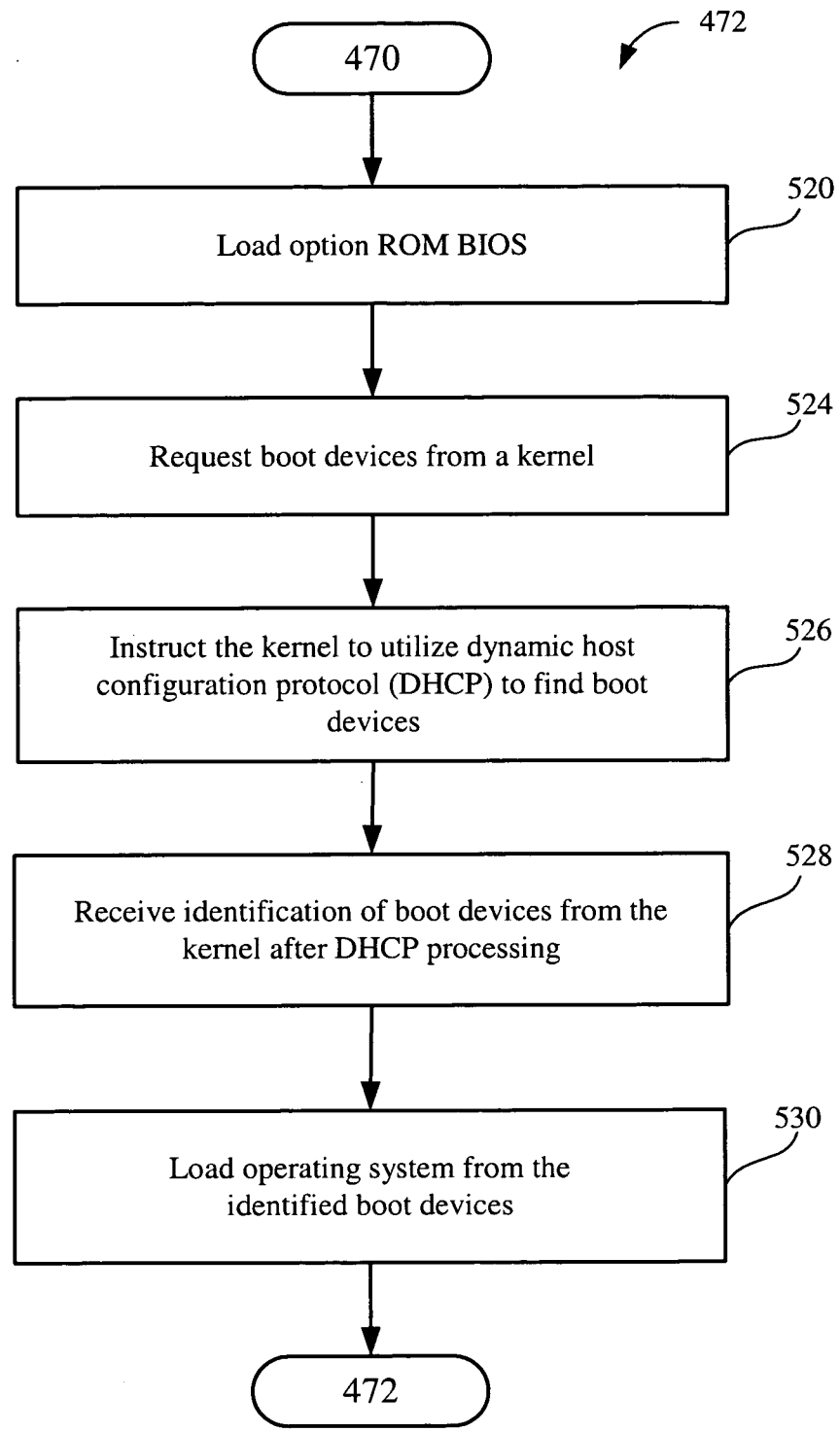
FIG. 10 defines a flowchart which sets up additional servers in accordance with one embodiment of the present invention.

FIG. 10 defines a flowchart 472 which sets up additional servers in accordance with one embodiment of the present invention. In this embodiment, the flowchart 472 begins with operation 520 which loads option ROM BIOS.

After operation 520, the method advances to operation 524 which requests boot devices from a kernel. Then operation 526 instructs the kernel to utilize a dynamic host configuration protocol (DHCP) to find boot devices. The DHCP may be any suitable code in hardware or software that enables the finding of boot devices over a network. After operation 526, the method moves to operation 528 which receives identification of boot devices from the kernel after DHCP is run. Then the flowchart 472 ends with operation 530 which loads operation system from the identified boot devices.

Figure 11:
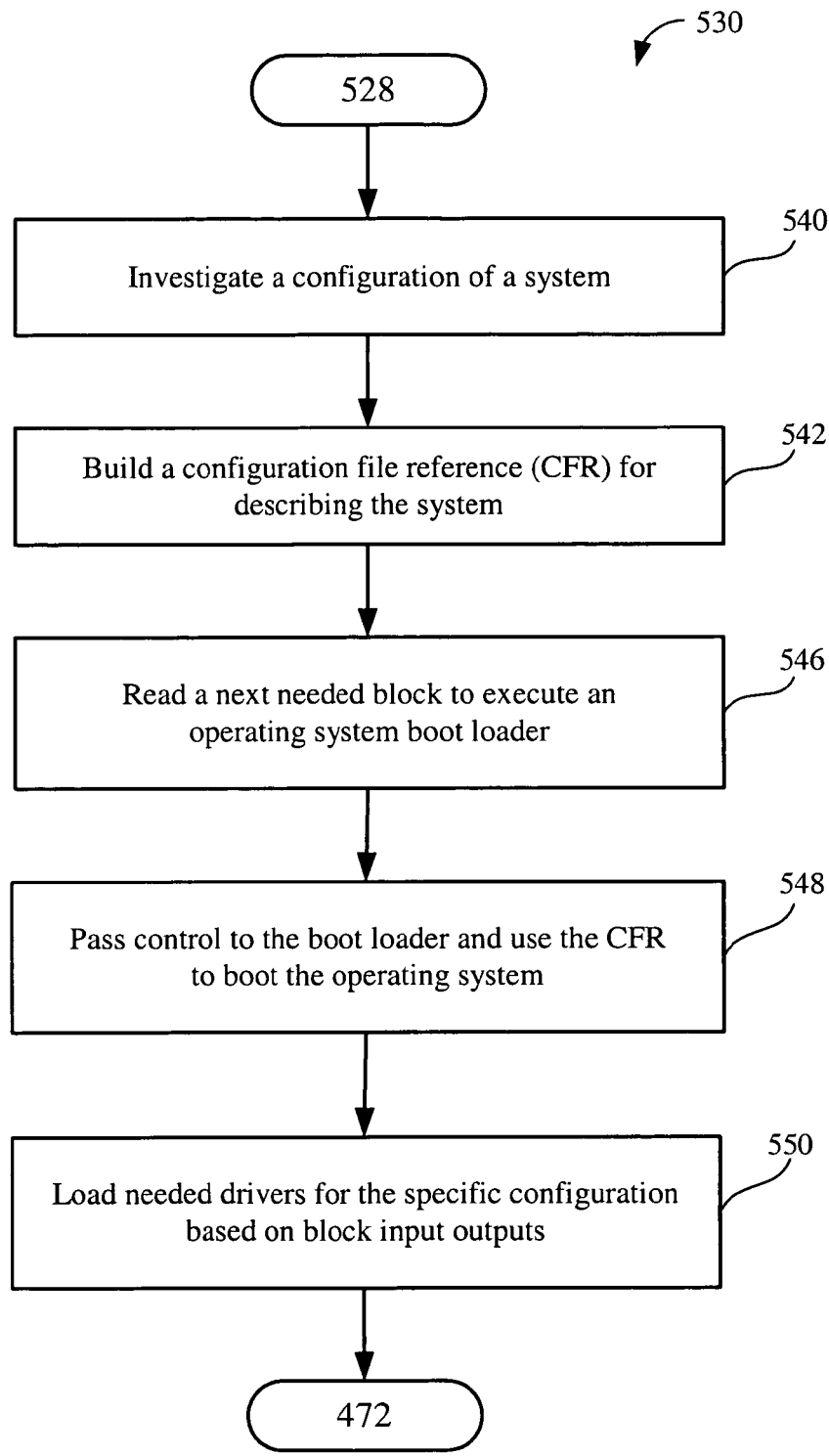
FIG. 11 illustrates a flowchart which loads the operating system from the identified boot devices.

FIG. 11 illustrates a flowchart 530 which defines the loading of the operating system using DCP from the identified boot devices in accordance with one embodiment of the present invention. In one embodiment, the flowchart 530 starts with operation 540 which investigates a configuration of a system. In one embodiment, the dynamic configuration program (DCP) does not start loading sectors like a boot loader normally would but moves through operations 540 through 550. The DCP, in one embodiment, is initially written to the target storage device during installation of the operating system on the target storage device. It should be appreciated that the DCP may be written during operating system installation in a portion of the master boot record that is typically occupied by the boot loader. It should be appreciated that the DCP may be loaded into any suitable portion of the system memory for running. During operation 540, in one embodiment, the kernel loads DCP into system memory location 0:7E00. In one embodiment, the DCP is generated and configured to have the capability to accomplish operations 540, 542, 546, and 548. It should be understood that the DCP may be configured in a hardware or software form as long as the operations described herein may be run.

After operation 540, the method proceeds to operation 542 which builds the configuration file reference for describing the system. In one embodiment, the DCP runs and by scanning the system determines the configuration of the system. Based on this configuration, the DCP generates the configuration file reference (CFR) and writes the CFR to the system memory. The CFR may be utilized by the boot loader so the boot loader may have system information for advancement of boot up processes.

Then the method advances to operation 546 which reads a next needed block to execute an operating system boot loader. In this operation, in one embodiment, the DCP reads the OS boot loader which is the next needed block of data on the target storage device(s). The boot loader is configured to have data regarding the location of the CFR. OS boot loader can then be executed as discussed in more detail in reference to operation 548.

After operation 546, the method advances to 548 which passes control to the boot loader and using the CFR to boot the operating system. In this operation, the CFR receives control of the boot up process from the DCP and continues to boot the operating system by using the system configuration as saved in the CFR.

Then the flowchart 530 finishes with operation 550 where the operating system loads needed drivers for the specific configuration based on block input outputs. In this operation, inputs and outputs are accomplished by block data transfer (also know as sector based transfer) instead of the typical file based input output. In this way, the restrictions of the utilization of a file based process does not apply in block based data transfer such as, for example, transfer protocols like IP, TFTP and UDP.

Using the methodology as described in FIGS. 8 through 11, by using DCP, after a first server has been set up for boot up from the target storage device where the operating system has been stored, the remaining servers may boot up and load the operating system from the target storage device(s) without a setup process having occurred. This may occur because the kernel may use the DCP to determine the configuration of the network and determine whether an operating system has installed and the locations on the target storage device from which bootup may occur. Exemplary embodiments using the methods of FIGS. 8 through 11 with an iSCSI system are discussed below. iSCSI protocol as generally used is known to those skilled in the art. It should be appreciated that the embodiments described below are exemplary and are specific examples of how the method described herein may be utilized.

Consequently, in one exemplary embodiment of an installation process, an end user may indicate that installation is for an iSCSI target (or OS is packaged/configured only for iSCSI environment). In a first phase when DCP is not available, a user may preset the target ID (TID)/logical unit (LUN) for installing an OS to a specific target on the system and may present any other parameters needed for boot image location and access. The TID/LUN may serve to identify the target device. The installation setup then uses BIOS/Option ROM int13 calls. The use of int13 calls in a boot up process is known to those skilled in the art. The installation setup then proceeds by using the driver to the boot PCI device to continue installation.

Then in an exemplary boot up process in this embodiment, an iSCSI client discovers an iSCSI target based on a pre-configured IP address on iSCSI initiator host adapter, or request a list of IP addresses for all iSCSI boot servers through DCP protocol. Then the BIOS initializes and requests a first sector from the target storage device and jumps to the loaded sector (OS loader) in the host memory. Then once the OS loader is running it becomes iSCSI environment aware. The OS loader discovers and builds a mapping of the hardware configuration of the iSCSI client is running on. Then the OS loaders runs input/outputs through the BIOS requesting the rest of the OS image sequentially through multiple BIOS/Option ROM int13 calls, in the form of block IOs. The OS loader sequentially copies the OS image to host memory and runs OSA from memory. The OS performs all the system level writes and shuts down to iSCSI client host memory it is running on. In case of hibernation, a disk space (LUN) may be allocated on the target side through the Driver or sustain power to host memory.

In another exemplary embodiment of an installation process, an end user may indicate that installation is for an iSCSI target (or OS is packaged/configured only for iSCSI target installation). In a first phase when DCP is not available, a user may preset the TID/LUN for installing an OS to a specific target on the system and may present any other parameters needed for boot image location and access. The installation setup then uses BIOS/Option ROM int13 calls. The installation setup then proceeds by using the driver to the boot PCI device to continue installation. The OS or NBP maintains relationship between files and system block level inputs and outputs.

Then in an exemplary bootup process, an iSCSI client discovers an iSCSI target based on a pre-configured IP address (preset during installation) on iSCSI initiator host adapter, or request a list of IP addresses for all iSCSI boot servers through DCP protocol. Then the BIOS initializes and requests a first sector from the target storage device and jumps to the loaded sector (OS loader) in the host memory. Then once the OS loader is running it becomes iSCSI environment aware. Then the OS loaders runs input/outputs through the BIOS requesting the rest of the OS image sequentially through multiple BIOS/Option ROM int13 calls, in the form of block IOs. The OS loader sequentially copies the OS image to host memory and runs OS from memory. The OS performs all the system level writes and shuts down to iSCSI client host memory it is running on. In case of hibernation, a disk space (LUN) may be allocated on the target side through the Driver or sustain power to host memory.

The present invention may implemented using an appropriate type of software driven computer-implemented operation. As such, various computer-implemented operations involving data stored in computer systems to drive computer peripheral devices (i.e., in the form of software drivers) may be employed. These operations are those requiring physical manipulation of physical quantities. Usually, though not necessarily, these quantities take the form of electrical or magnetic signals capable of being stored, transferred, combined, compared and otherwise manipulated. Further, the manipulations performed are often referred to in terms such as ascertaining, identifying, scanning, or comparing.

Any of the operations described herein that form part of the invention are useful machine operations. Any appropriate device or apparatus may be utilized to perform these operations. The apparatus may be specially constructed for the required purposes, or it may be a general purpose computer selectively activated or configured by a computer program stored in the computer. In particular, various general purpose machines may be used with computer programs written in accordance with the teachings herein, where it may be more convenient to construct a more specialized apparatus to perform the required operations.

Although the foregoing invention has been described in some detail for purposes of clarity of understanding, it will be apparent that certain changes and modifications may be practice within the scope of the appended claims. Accordingly, the present invention is to be considered as illustrative and not restrictive, and the invention is not to be limited to the details given herein, but may be modified within the scope and equivalence of the appended claims.

What is claimed is:

1. A method to boot up a server using a target storage device selected from a plurality of independent storage devices located in a subsystem over a network, comprising:
   interactively installing an operating system by entering a setup mode on the server;
   receiving an IP address of the subsystem from the user while in the setup mode;
   finding the subsystem at the IP address over the network;
   receiving identification of the target storage device where installation is to occur from the user while in the setup mode;
   storing the operating system and a dynamic configuration program in the target storage device selected from the plurality of independent storage devices located in the subsystem; and
   booting the operating system on the target storage device using the identification and IP address input by the user while in the setup mode, the booting occurring through block data transfer, wherein the server communicates with the target storage device by using iSCSI protocol.

2. A method to boot up a server as recited in claim 1, wherein the installing includes:
   determining a network system configuration after power on;
   receiving instruction to install the operating system; and
   copying the operating system into the target storage device over the network using block data transfer.

3. A method to boot up a server as recited in claim 1, further comprising:
   setting up an additional server, to be booted up by the target storage device over the network, using programmed operations to enable the bootup of the additional server from the target storage device without user intervention.

4. A method to boot up a server as recited in claim 1, wherein the operating system utilizes a graphical user interface.

5. A method to boot up a server as recited in claim 1, wherein the target storage device is a one of a disk drive, a CD-R, and a CD-RW.

6. A method to boot up a server as recited in claim 1, wherein the server includes an iSCSI card which facilitates iSCSI protocol communications between the server and the target storage device.

7. A method to boot up a server as recited in claim 1, wherein accessing the operating system includes:
   accessing data at a first sector of a boot device, the location of the first sector being located in the target storage device designated by the IP address and the identification received during the installation process; and
   retrieving an operating system boot loader at the first sector of the target storage device.

8. A method to interactively install an operating system on a target storage device selected from a plurality of independent storage devices in a subsystem over a network, comprising:
   initiating a setup mode to install the operating system;

receiving an IP address of the subsystem from the user while in the setup mode;

determining the plurality of independent storage devices located in the subsystem;

finding the subsystem at the IP address over the network;

receiving identification of a target storage device selected from the plurality of storage devices located in the subsystem, the identification being received from the user while in the setup mode; and installing the operating system in the target storage device selected from the plurality of independent storage devices in the subsystem using block data transfer, wherein iSCSI is utilized as a data transfer protocol.

9. A method to install an operating system as recited in claim 8, wherein initiating setup occurs when a particular keystroke is received.

10. A method to install an operating system as recited in claim 8, wherein determining the plurality of independent storage devices located in the subsystem includes, instructing an iSCSI IOP to utilize a kernel to determine the plurality of storage devices located in the subsystem designated by the IP address.

11. A method to install an operating system as recited in claim 8, wherein receiving identification of a target storage device includes, displaying the plurality of independent storage devices in the subsystem, receiving input indicating the location of the target storage device to be used as a boot device.

12. A method to install an operating system as recited in claim 8, wherein the operating system is a graphical user interface system.

13. A method to install an operating system as recited in claim 8, wherein installing the operating system includes, copying operating system files to the target storage device over the network using block data transfer.

14. A method to install an operating system as recited in claim 8, wherein installing the operating system on the target storage device allows a plurality of servers to be booted up by accessing the operating system on the target storage device through utilizing a dynamic host configuration protocol (DHCP) to find target storage device where the operating system is installed.

15. A method to boot up a server from a target storage device selected from a plurality of independent storage devices located in a subsystem over a network, comprising:

retrieving an operating system boot loader at a first sector of the target storage device selected from the plurality of independent storage devices located in the subsystem over the network; and booting up the server using the operating system located on the target storage device by using the operating system boot loader, wherein data transfer of the operating system from the target storage device to the server is accomplished by use of an iSCSI protocol, and wherein the operating system is interactively installed on the target storage device by entering a setup mode on the server, receiving an IP address of the subsystem from a user while in the setup mode, finding the subsystem at the IP address over the network, receiving identification of the target storage device where installation is to occur from the user while in the setup mode, and storing the operating system and a dynamic configuration program in the target storage device selected from the plurality of independent storage devices located in the subsystem.

16. A method to boot up a server as recited in claim 15, wherein retrieving the operating system boot loader includes:

instructing an option ROM BIOS to direct a kernel to obtain the operating system boot loader at the first sector;

copying the operating system boot loader into memory on the server; and running the operating system boot loader to boot up the server.

17. A method to boot up a server as recited in claim 15, wherein booting up the server includes, copying operating system data to memory on the server.

* * * * *